(12) United States Patent
Yu et al.

(10) Patent No.: US 10,857,908 B2
(45) Date of Patent: Dec. 8, 2020

(54) SIDE EXTENSION DEVICE FOR SEAT OF VEHICLE

(71) Applicants: Hyundai Motor Company, Seoul (KR); Kia Motors Corporation, Seoul (KR)

(72) Inventors: Sang Uk Yu, Seoul (KR); Seong Mun Yun, Hwaseong-si (KR); Hyun Kyu Moon, Hwaseong-si (KR); Seon Chae Na, Yongin-si (KR); Mu Young Kim, Hwaseong-si (KR); Hyung Jin Park, Seoul (KR); Byung Yong Choi, Hwaseong-si (KR); Chan Ho Jung, Gunpo-si (KR); Ju Yeol Kong, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/379,612

(22) Filed: Apr. 9, 2019

(65) Prior Publication Data

US 2020/0156503 A1    May 21, 2020

(30) Foreign Application Priority Data

Nov. 19, 2018  (KR) .......................... 10-2018-0142280

(51) Int. Cl.
*B60N 2/90* (2018.01)
*B60N 2/02* (2006.01)
*B60N 2/70* (2006.01)

(52) U.S. Cl.
CPC ............. *B60N 2/02* (2013.01); *B60N 2/7094* (2013.01); *B60N 2/986* (2018.02); *B60N 2/99* (2018.02); *B60N 2002/0288* (2013.01)

(58) Field of Classification Search
CPC ........ B60N 2/986; B60N 2/643; B60N 2/646; B60N 2/5858; B60N 2/5816
See application file for complete search history.

(56) References Cited

U.S. PATENT DOCUMENTS 4,383,342 A * 5/1983 Forster ................. A61H 1/0218
                                                                        5/731
4,973,105 A * 11/1990 Itou ....................... B60N 2/161
                                                                        297/218.1

(Continued)

FOREIGN PATENT DOCUMENTS

DE         3127303 A1 *  1/1983   ............. B60N 2/914
DE         3643876 A1 *  6/1988   ............. B60N 2/986

(Continued)

*Primary Examiner* — Timothy J Brindley
(74) *Attorney, Agent, or Firm* — Morgan, Lewis & Bockius LLP

(57) ABSTRACT

A side extension device for a seat of a vehicle, may include a seat cushion frame for forming a framework, a cushion pad provided with a bolster formed on each of opposite sides thereof, and a seat cover for covering a surface of the cushion pad, wherein a plurality of slits is formed in the bolster of the cushion pad, and divided bolster parts are formed between the slits, wherein the divided bolster parts are successively inclined outward by contact pressure of side parts of hips of an occupant, so that the bolster spreads outward.

12 Claims, 4 Drawing Sheets

(56) References Cited

U.S. PATENT DOCUMENTS

| | | | | |
|---|---|---|---|---|
| 5,226,188 | A * | 7/1993 | Liou | A47C 7/742 |
| | | | | 297/452.46 |
| 5,251,963 | A * | 10/1993 | Inayoshi | A47C 7/029 |
| | | | | 297/452.29 |
| 8,162,402 | B2 * | 4/2012 | Yamauchi | B60N 2/7035 |
| | | | | 297/452.21 |
| 8,231,174 | B2 * | 7/2012 | Yamada | B60N 2/20 |
| | | | | 297/284.11 |
| 2002/0178505 | A1 * | 12/2002 | Kienlein | A47C 7/503 |
| | | | | 5/730 |
| 2008/0054702 | A1 * | 3/2008 | Ali | B68G 7/05 |
| | | | | 297/452.26 |
| 2008/0290716 | A1 * | 11/2008 | Ekornes | A47C 27/20 |
| | | | | 297/452.48 |
| 2010/0171346 | A1 * | 7/2010 | Laframboise | B29C 44/12 |
| | | | | 297/183.1 |
| 2010/0194171 | A1 * | 8/2010 | Hirata | B60N 2/01508 |
| | | | | 297/452.48 |
| 2016/0207429 | A1 * | 7/2016 | Fitzpatrick | B60N 2/646 |
| 2018/0056836 | A1 * | 3/2018 | Schacht | B60N 2/686 |

FOREIGN PATENT DOCUMENTS

| | | | | |
|---|---|---|---|---|
| DE | 102008047698 | A1 * | 3/2010 | B60N 2/449 |
| DE | 102009051120 | A1 * | 5/2011 | B60N 2/99 |
| DE | 102015213995 | A1 * | 1/2017 | B60N 2/646 |
| EP | 0670240 | A1 * | 9/1995 | B60N 2/986 |
| EP | 3020600 | A1 * | 5/2016 | B60N 2/72 |
| WO | WO-02057110 | A1 * | 7/2002 | B60N 2/70 |
| WO | WO-2005122834 | A1 * | 12/2005 | B60N 2/646 |
| WO | WO-2016190018 | A1 * | 12/2016 | |

\* cited by examiner

SIDE EXTENSION DEVICE FOR SEAT OF VEHICLE

CROSS-REFERENCE TO RELATED APPLICATION

The present application claims priority to Korean Patent Application No. 10-2018-0142280 filed on Nov. 19, 2018, the entire contents of which is incorporated herein for all purposes by this reference.

BACKGROUND OF THE INVENTION

Field of the Invention

The present invention relates to a side extension device for a seat of a vehicle. More particularly, it relates to a side extension device configured for a seat of a vehicle which allows side bolster parts of a seat cushion to automatically spread outward by seating pressure of an occupant with a large lower body.

Description of Related Art

As is well known, a seat for a vehicle may include a seat cushion configured to support the lower body including the hips of an occupant, a seat back configured to allow the occupant to lean his or her upper body thereon, and a headrest configured to support the head and the neck of the occupant.

Furthermore, various seat-related devices for convenience such as a seat back reclining device, and an electric-powered mechanism for shifting the seat forward, rearward, upward, or downward are disposed in the seat.

Referring to FIG. 1, a seat cushion 10 includes therein a seat cushion frame 14 for forming a framework, and a cushion pad 16 for providing a cushioning function when an occupant sits on the seat cushion 10. The surface of the cushion pad 16 is covered with a seat cover 18.

Furthermore, as a partial configuration of the seat for safety of the occupant, bolsters 12 respectively protrude from left and right sides of the seat cushion 10 to support side parts of the lower body including the hips of the occupant and prevent the lower body from leaning to one side due to centrifugal force or the like.

Thus, when the occupant sits on the seat cushion, external side portions of the hips and thighs of the occupant are enclosed by the bolsters 12. Accordingly, when the vehicle turns, the bolsters 12 may prevent the lower body of the occupant from leaning to one side thereof.

However, in the case of an occupant with large hips, as shown in FIG. 1, since opposite sides of the hips may be placed over the bolsters 12, the bolsters 12 may rather give foreign body sensation to the occupant who sits on the seat, thus making the occupant uncomfortable. Consequently, the bolsters 12 may not exert the positive functions thereof.

Of course, a seat which is selectively increased in left and right surface areas may be manufactured for occupants with large hips. However, in the instant case, when an occupant with small or normal hips sits on the seat, the hips of the occupant may not be enclosed by the bolsters mounted on the left and right sides of the seat. Thus, the bolsters may not function properly. Furthermore, since the seat is disposed in a confined internal space of the vehicle, the increase in volume and surface area of the seat is limited.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a side extension device configured for a seat of a vehicle in which a plurality of slits are formed in each of bolsters of a cushion pad which is provided in a seat cushion, so that divided bolster parts provided between the slits are inclined outward, e.g., in a domino-falling pattern, by contact pressure of side parts of the hips of an occupant, thus allowing the overall bolsters to spread outward, whereby seating comfort of the seat for the occupant with large hips may be enhanced.

In one aspect, the present invention may provide a side extension device configured for a seat of a vehicle, including a seat cushion frame for forming a framework, a cushion pad provided with a bolster formed on each of opposite sides thereof, and a seat cover for covering a surface of the cushion pad. A plurality of slits may be formed in the bolster of the cushion pad, and divided bolster parts may be formed between the slits. The divided bolster parts may be successively inclined outward by contact pressure of side parts of hips of an occupant, so that the bolster spreads outward.

In an exemplary embodiment of the present invention, the plurality of slits may be formed at a predetermined depth downwardly from an upper surface of the bolster of the cushion pad and disposed at positions spaced from each other at regular intervals along a lateral direction of the seat.

In another exemplary embodiment of the present invention, a leaf spring for supporting an external side surface of the bolster may be attached to the seat cushion frame.

In yet another exemplary embodiment of the present invention, the leaf spring may elastically support the bolster during an outward spreading operation of the bolster, and provide elastic restoring force to the bolster to allow the bolster that has spread to return to an original position thereof.

In yet another exemplary embodiment of the present invention, a width adjustment frame may be placed on a side frame of the seat cushion frame so that, when the bolster spreads outward, the width adjustment frame moves outward along with the bolster.

In still yet another exemplary embodiment of the present invention, the width adjustment frame may include an upper plate having a width greater than a width of the side frame of the seat cushion frame, and lower plates configured to extend downwardly from opposite end portions of the upper plate and disposed at positions spaced from opposite side surfaces of the side frame.

In a further exemplary embodiment of the present invention, a spring configured to be compressed when the width adjustment frame moves outward may be coupled between the width adjustment frame and the side frame.

In another further exemplary embodiment of the present invention, a stopper for noise prevention and shock absorption in contact between the side frame and the width adjustment frame may be attached to an external side surface of the side frame.

In yet another further exemplary embodiment of the present invention, an elastic band may be coupled to an internal rear end portion of the seat cover that covers the bolster of the cushion pad, and a hook locked and fixed to the seat cushion frame may be coupled to an end portion of the elastic band.

As described above, the present invention has the following effects.

A plurality of slits is formed in each of the bolster parts of a cushion pad which is provided in the seat cushion, so that bolster division parts provided between the respective slits are inclined outward, e.g., in a domino-falling pattern, by contact pressure of side parts of the hips of an occupant, thus allowing the overall bolster parts to spread outward. Consequently, the seating surface area of the seat for the occupant with the large hips may be increased, and the seating comfort of the seat may be enhanced.

Other aspects and exemplary embodiments of the disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
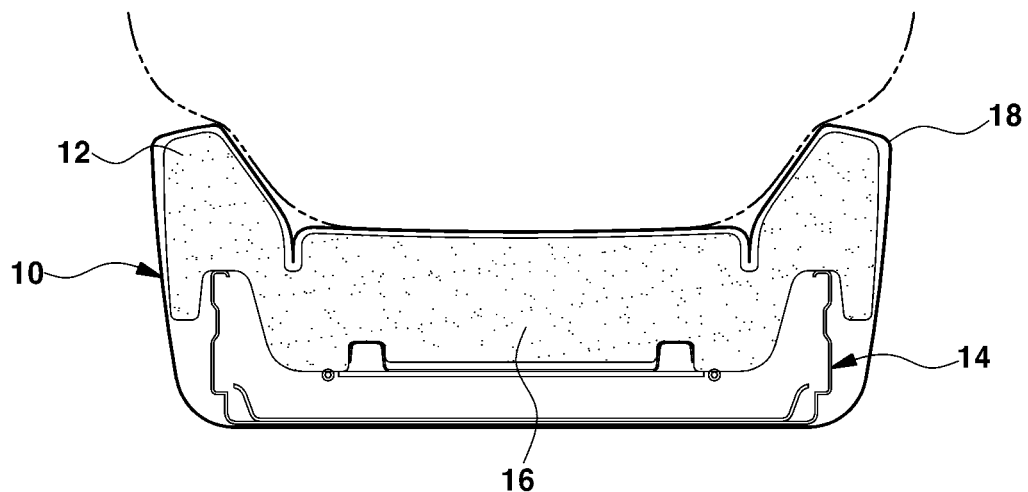
FIG. 1 is a sectional view exemplarily illustrating a state in which an occupant with large hips sits on a conventional seat cushion.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, various embodiments of the present invention will be described in detail with reference to the accompanying drawings.

Figure 2:
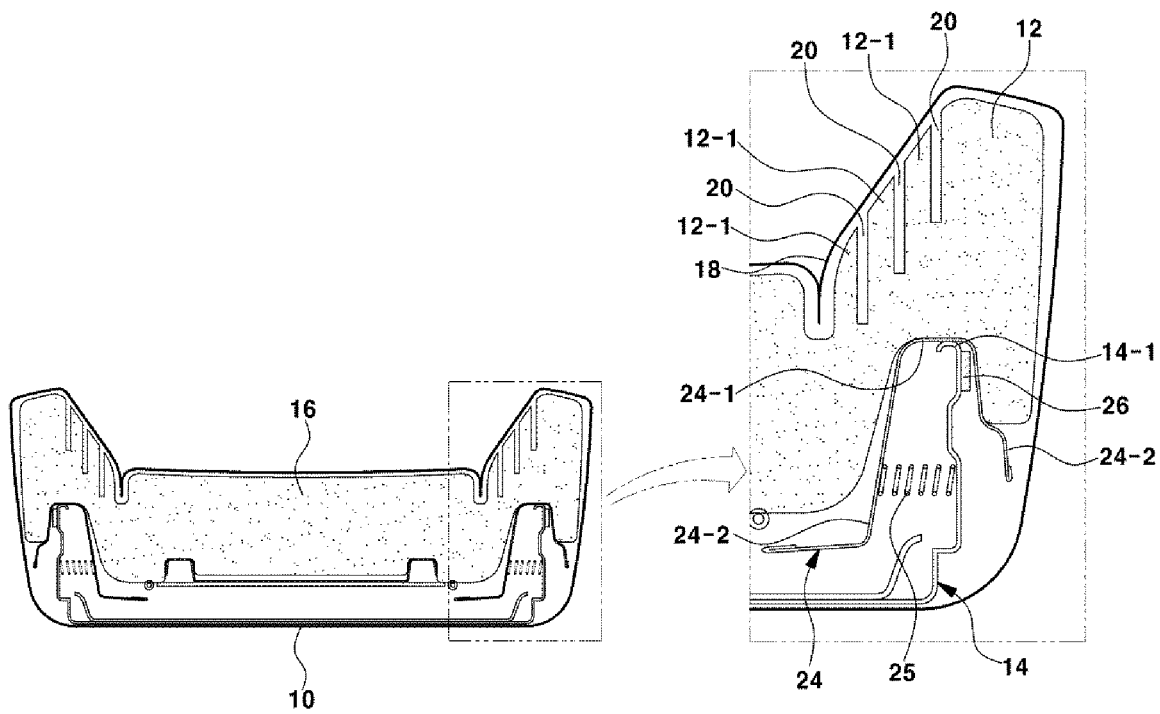
FIG. 2 is a sectional view exemplarily illustrating a side extension device configured for a seat of a vehicle according to an exemplary embodiment of the present invention.
Figure 3:
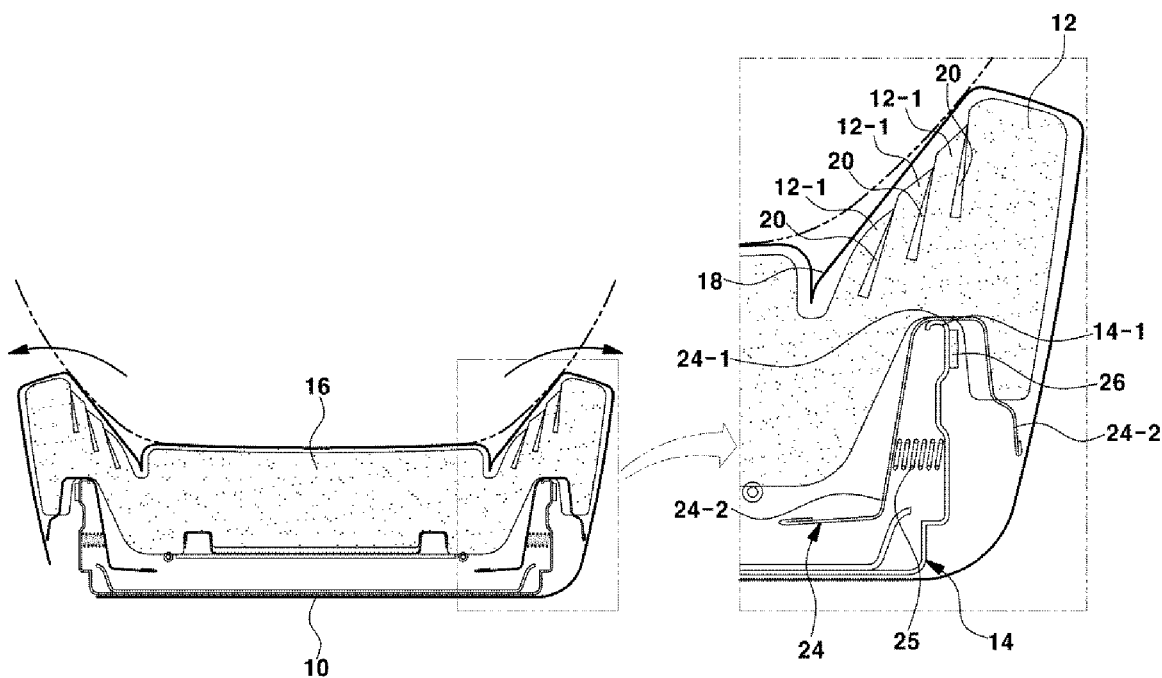
FIG. 3 is a sectional view exemplarily illustrating a state in which an occupant with large hips sits on a seat cushion to which the side extension device according to an exemplary embodiment of the present invention is applied.

FIG. 2 and FIG. 3 are sectional views showing a side extension device configured for a seat of a vehicle according to an exemplary embodiment of the present invention, and respectively illustrate states before and after the side extension device is operated.

In FIG. 2 and FIG. 3, reference numeral 10 denotes a seat cushion.

The seat cushion 10 includes therein a seat cushion frame 14 for forming a framework, and a cushion pad 16 for providing a cushioning function when an occupant sits on the seat cushion 10. The surface of the cushion pad 16 is covered with a seat cover 18.

Furthermore, bolsters 12 respectively protrude from left and right sides of the seat cushion 10 to support side parts of the lower body including the hips of the occupant and prevent the lower body from leaning to one side due to centrifugal force or the like when the vehicle turns.

In an exemplary embodiment of the present invention, a plurality of slits 20 are formed in each of the bolsters 12 of the cushion pad 16, so that divided bolster parts 12-1 are formed between the respective slits 20 as if the bolster 12 is divided into a plurality of parts.

The plurality of slits 20 are formed at a predetermined depth downwardly from an upper surface of the bolster 12 of the cushion pad 16 and disposed at positions spaced from each other at regular intervals along a lateral direction of the seat cushion.

Hence, when the occupant with the large hips sits on the seat cushion 10, as shown in FIG. 3, the divided bolster parts 12-1 are successively inclined outward by pressure applied to portions of the seat cushion 10 with which the side parts of the hips of the occupant come into contact. Thus, the overall bolsters 12 spread and extend outward so that a seating surface area of the seat cushion on which the occupant with the large hips sits may be increased. Furthermore, the bolsters 12 may be prevented from giving foreign body sensation to the occupant, whereby the seating comfort of the seat may be enhanced.

On the one hand, if the seat cushion frame 14 coupled to the cushion pad 16 in the seat cushion 10 is fixed and only the bolsters 12 of the cushion pad 16 incline and spread outward, the bolsters 12 may not smoothly extend outward.

Therefore, a side frame 14-1 that supports a lower portion of each of the bolsters 12 of the seat cushion frame 14 move outward along with the bolster 12 to make the outward extension of the bolster 12 smooth.

To the present end, a width adjustment frame 24 is placed in an insert manner on the side frame 14-1 of the seat cushion frame 14 so that, when the bolster 12 spreads and extends outward, the width adjustment frame 24 moves a predetermined distance outward along with the bolster 12.

In more detail, the width adjustment frame 24 includes an upper plate 24-1 which has a width greater than that of the side frame 14-1 of the seat cushion frame 14, and support-leg-shaped lower plates 24-2 which extend downwardly from opposite end portions of the upper plate 24-1 and are disposed at positions spaced from opposite side surfaces of the side frame 14-1.

Furthermore, a spring 25 is coupled between an internal surface of the internal lower plate 24-2 of the width adjustment frame 24 and an internal surface of the side frame 14-1 so that, when the width adjustment frame 24 moves outward, the spring 25 is compressed to allow the width adjustment frame 24 that has moved outward to return to its original position.

Therefore, when the occupant with the large hips sits on the seat cushion 10, as shown in FIG. 3, the divided bolster parts 12-1 are successively inclined outward by contact pressure of the side parts of the hips of the occupant, so that the overall bolsters 12 spread and extend outward, and simultaneously, the width adjustment frames 24 are also moved outward by predetermined distances by the pressure of the hips of the occupant.

Accordingly, when the bolsters 12 of the cushion pad 16 incline and spread outward, the width adjustment frames 24 that support the bolsters 12 also move outward. Hence, the outward extension operation of the bolsters 12 may be more smoothly performed.

Of course, if the pressure generated by the hips of the occupant is removed (e.g., an empty seat state), each width adjustment frame 24 may return to its original position by the elastic restoring force of the corresponding spring 25, and the bolster 12 which is supported by the width adjustment frame 24 and has the plurality of slits 20 and the divided bolster parts 12-1 may also return to its original position by elastic restoring force that the cushion pad itself has.

Here, since both the side frame 14-1 and the width adjustment frame 24 are made of metal, noise may be generated by contact impact. To prevent this, a stopper 26 for noise prevention and shock absorption in contact between the side frame 14-1 and the width adjustment frame 24 is attached to an external side surface of the side frame 14-1.

In an exemplary embodiment of the present invention, the stopper 26 may be attached to an internal side surface of the support-leg-shaped lower plates 24-2.

Figure 4:
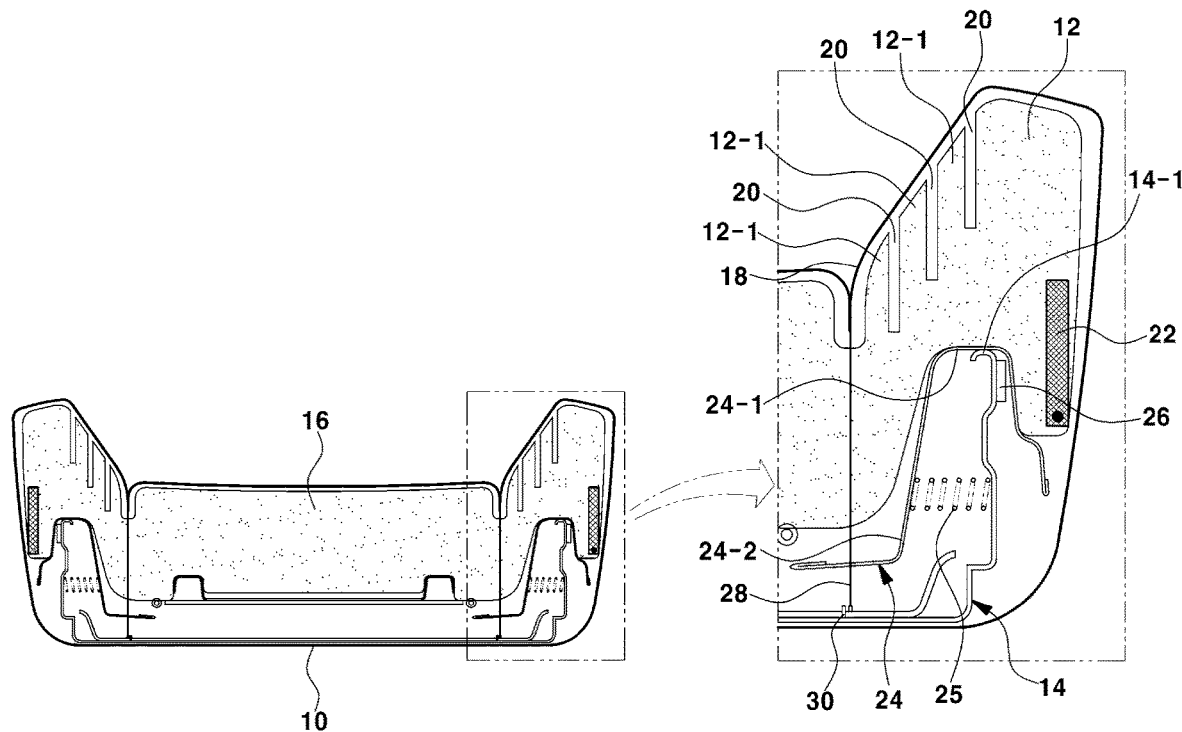
FIG. 4 is a sectional view exemplarily illustrating a side extension device configured for a seat of a vehicle according to various exemplary embodiments of the present invention.
Figure 5:
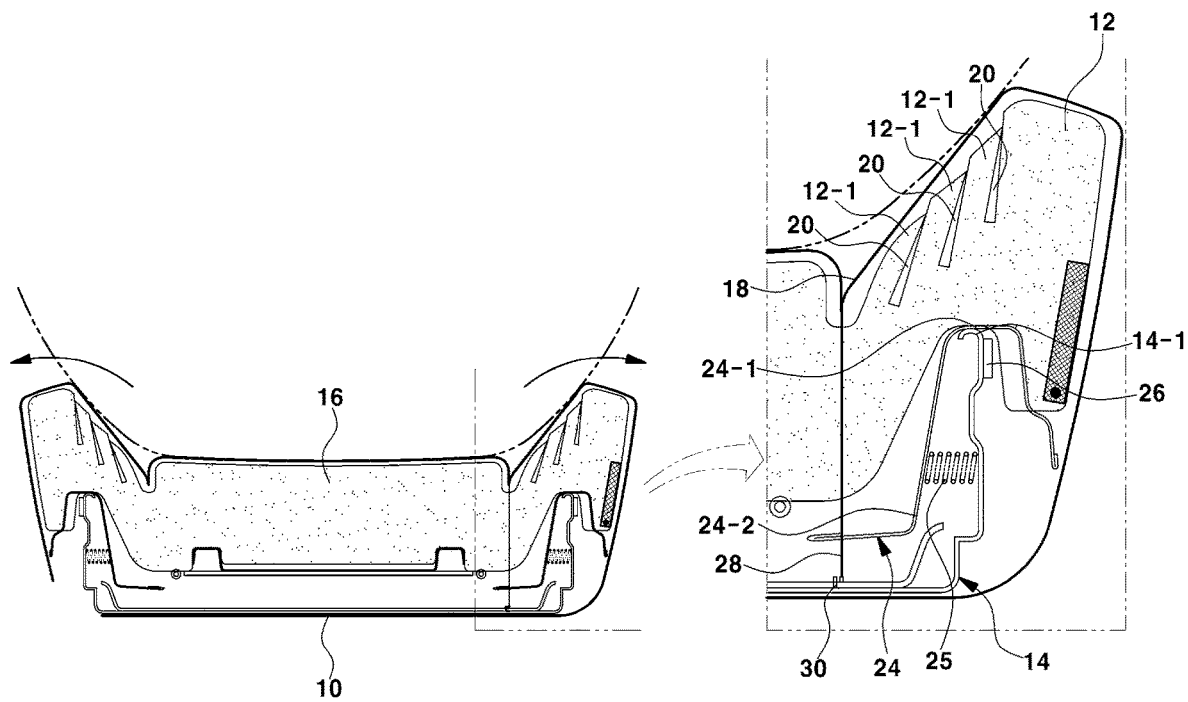
FIG. 5 is a sectional view exemplarily illustrating a state in which an occupant with large hips sits on a seat cushion to which the side extension device according to the exemplary embodiment of the present invention is applied.

FIG. 4 is a sectional view exemplarily illustrating a side extension device configured for a seat of a vehicle according to various exemplary embodiments of the present invention, and FIG. 5 is a sectional view exemplarily illustrating a state in which an occupant with large hips sits on a seat cushion to which the side extension device according to the exemplary embodiment of the present invention is applied. In FIG. 4 and FIG. 5, reference numeral 22 denotes a leaf spring.

If the operation of inclining and spreading the bolsters 12 of the cushion pad 16 outward is repeatedly performed, each bolster 12 may be deformed, e.g., not to return to its original position, although the bolster 12 has its own elastic restoring force. To prevent this, as shown in FIG. 4 and FIG. 5, the leaf spring 22 for supporting an external side surface of the bolster 12 is attached to the seat cushion frame 14.

In the instant case, when the bolster 12 spreads outward, as shown in FIG. 5, the leaf spring 22 slightly bends outward and elastically supports the external side surface of the bolster 12. When the load of the occupant is removed, the leaf spring 22 provides the elastic restoring force to the bolster 12 so that the bolster 12 can return to its original position. Hence, the bolster 12 that has inclined and spread outward may more easily return to its original position.

On the one hand, when the bolsters 12 of the cushion pad 16 incline and spread outward by the weight of the hips of the occupant, the seat cover 18 that covers the bolsters 12 may forcibly stretch, whereby the seat cover 18 may wrinkle. To prevent this, when the bolsters 12 extend outward, there is a need to elastically extend the seat cover 18 that covers the bolsters 12.

To the present end, as shown in FIG. 4, an elastic band 28 is coupled to an internal rear end portion of the seat cover 18 that covers the bolsters 12 of the cushion pad 16. A hook 30 locked and fixed at a predetermined position to the seat cushion frame 14 is coupled to an end portion of the elastic bad 28.

In more detail, in a lateral section of the seat cover 18, a portion of a seating portion of the seat cushion and a portion of each bolster 12 overlap with each other in a boundary therebetween, and are forcibly inserted into the cushion pad 16. The elastic band 28 having a predetermined length is elastically coupled to the internal rear end portion of the forcibly inserted portion of the seat cover 18. The hook 30 locked and fixed at the predetermined position to the seat cushion frame 14 is coupled to the end portion of the elastic band 28.

Therefore, when each of the bolsters 12 inclines and spreads outward through the slits 20 and the divided bolster parts 12-1 by the weight of the hips of the occupant, and when the contact load by the hips is also applied to the seat cover 18 that covers the bolsters 12, the elastic band 28 elastically extends and the seat cover 18 that covers the bolsters 12 extend outward by a predetermined degree. When the contact load by the hips is removed, the seat cover 18 may return to its original position by the elastic restoring force of the elastic band 28.

Figure 6:
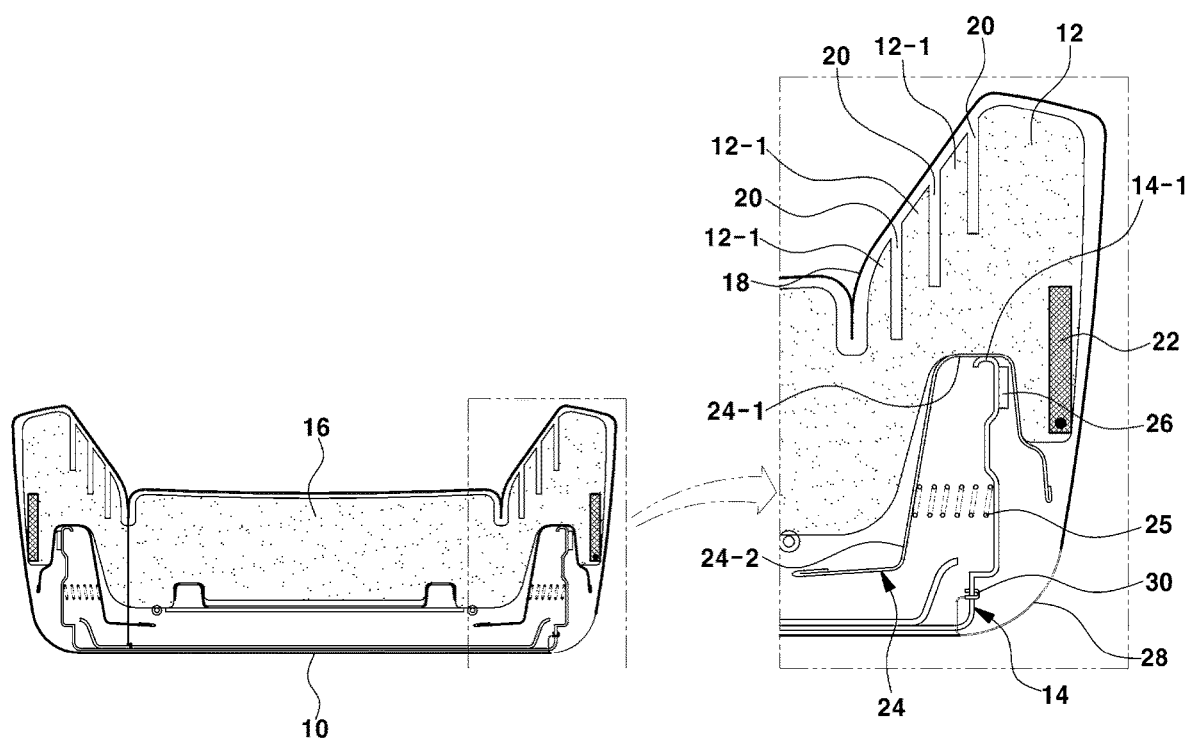
FIG. 6 is a sectional view exemplarily illustrating another exemplary embodiment of an elastic band connection structure among components of the side extension device according to an exemplary embodiment of the present invention.

In another exemplary embodiment of the present invention, as shown in FIG. 6, the elastic band 28 may be coupled to an external rear end portion of the seat cover 18. The end portion of the elastic band 28 that has stretched may be locked and fixed at a predetermined position to the seat cushion frame 14 using a hook 30. Thus, when the contact load by the hips which is applied to the seat cover 18 covering the bolsters 12 is removed, the seat cover 18 may return to its original position by the elastic restoring force of the elastic band 28.

Accordingly, since when the bolsters 12 extend outward the seat cover 18 is allowed to elastically stretch along with the bolsters 12, a phenomenon in which the seat cover 18 may wrinkle when the seat cover 18 forcibly stretch may be easily prevented.

As described above, the plurality of slits 20 and the divided bolster parts 12-1 are formed in each of the bolsters 12 of the cushion pad 16 which is provided in the seat cushion 10, so that the divided bolster parts 12-1 provided between the respective slits 20 are inclined outward, e.g., in a domino-falling pattern, by contact pressure of the side parts of the hips of the occupant, thus allowing the overall bolsters 12 to spread and extend outward. Consequently, the seating surface area of the seat for the occupant with the large hips may be increased, and the seating comfort of the seat may be enhanced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side extension device for a seat of a vehicle, the side extension device comprising:
   a seat cushion frame for forming a framework; and
   a cushion pad mounted on the seat cushion frame and provided with a bolster formed on each of first and second opposite portions of the cushion pad,
   wherein a plurality of slits is formed in the bolster of the cushion pad, and divided bolster portions are formed between the plurality of slits,
   wherein the divided bolster portions are selectively inclinable successively outward according an external force applied to the divided bolster portions so that the bolster selectively spreads outward, and
   wherein a width adjustment frame engaged to the bolster is placed on a side frame of the seat cushion frame so that, when the bolster spreads outward, the width adjustment frame moves outward along with the bolster.

2. The side extension device of claim 1, wherein the plurality of slits is formed at a predetermined depth downwardly from an upper surface of the bolster of the cushion pad and mounted at positions spaced from each other at predetermined intervals along a lateral direction of the seat.

3. The side extension device of claim 1, wherein a first elastic member is mounted to the seat cushion frame and supports an external side surface of the bolster.

4. The side extension device of claim 3, wherein the first elastic member elastically supports the bolster during an outward spreading operation of the bolster to provide elastic restoring force to the bolster to allow the bolster that has spread to return to an original position of the bolster.

5. The side extension device of claim 1,
   wherein the width adjustment frame includes a lower plate and an upper plate engaged to the bolster, and
   wherein the lower plate and the upper plate are relatively movable with respect to a side frame formed to the seat cushion frame, according to the external force applied to the divided bolster portions.

6. The side extension device of claim 5,
   wherein the upper plate has a width greater than a width of the side frame of the seat cushion frame,
   wherein the lower plate includes a first lower plate extending downwardly from a first end portion of the upper plate and a second lower plate extending downwardly from a second end portion of the upper plate, and
   wherein the side frame is positioned between the first and second lower plates.

7. The side extension device of claim 5, wherein a second elastic member is mounted between the side frame and the lower plate.

8. The side extension device of claim 7, wherein the second elastic member is configured to be selectively compressed when the width adjustment frame moves outward.

9. The side extension device of claim 1, wherein a stopper for noise prevention and shock absorption in contact between the side frame and the width adjustment frame is attached to an external side surface of the side frame or an inner side surface of the lower plate.

10. The side extension device of claim 1, wherein an external surface of the cushion pad, is covered by a seat cover.

11. The side extension device of claim 10, wherein a first elastic band is coupled to an internal rear end portion of the seat cover that covers the bolster of the cushion pad, and a fastener locked and fixed to the seat cushion frame is coupled to an end portion of the elastic band.

12. The side extension device of claim 10, wherein a second elastic band is coupled to an external rear end portion of the seat cover and an end portion of the elastic band is fixed to the seat cushion frame.

* * * * *